(12) United States Patent
Cherunni

(10) Patent No.: US 12,021,735 B2
(45) Date of Patent: *Jun. 25, 2024

(54) SYSTEMS AND METHODS FOR IMPLEMENTING MULTI-PART VIRTUAL NETWORK FUNCTIONS

(71) Applicant: VMware, Inc., Palo Alto, CA (US)

(72) Inventor: Vinod Anthony Joseph Cherunni, Singapore (SG)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,328

(22) Filed: Apr. 4, 2022

(65) Prior Publication Data

US 2022/0239583 A1  Jul. 28, 2022

Related U.S. Application Data

(63) Continuation of application No. 16/452,328, filed on Jun. 25, 2019, now Pat. No. 11,296,975.

(51) Int. Cl.
*H04L 45/02* (2022.01)
*G06F 9/455* (2018.01)
(Continued)

(52) U.S. Cl.
CPC .......... *H04L 45/04* (2013.01); *G06F 9/45558* (2013.01); *H04L 45/507* (2013.01); *H04L 45/586* (2013.01); *G06F 2009/45595* (2013.01)

(58) Field of Classification Search
CPC ..... H04L 45/507; H04L 45/04; H04L 45/586; H04L 45/42; H04L 45/50; G06F 9/45558; G06F 2009/45595
See application file for complete search history.

(56) References Cited

U.S. PATENT DOCUMENTS 9,660,897 B1 * 5/2017 Gredler ................... H04L 45/50
10,469,317 B1   11/2019 Jiang
(Continued)

FOREIGN PATENT DOCUMENTS

CN   105760214 A   7/2016
CN   107534571     1/2018
(Continued)

OTHER PUBLICATIONS

International Search Report/Written Opinion PCT/US2020/039207 dated Oct. 12, 2020.
(Continued)

*Primary Examiner* — Oussama Roudani
(74) *Attorney, Agent, or Firm* — King Intellectual Asset Management

(57) ABSTRACT

Examples of the present disclosure can include a method. The method may include (1) obtaining, by an network function virtualization orchestrator ("NFVO"), path computation information from the integrated network, the integrated network including a virtual source and a virtual destination, (2) generating, using the path computation information, segments identifying portions of a virtual network path originating at the virtual source and terminating at the virtual destination, (3) generating, by a virtual infrastructure manager ("VIM"), a plurality of labels associated with physical links on the physical network corresponding to the identified portions of the virtual network path, and (4) determining, by the NFVO and using the plurality of labels, a network path for data transfer over the integrated network, the network path identifying virtual and physical network elements.

20 Claims, 5 Drawing Sheets

(51) Int. Cl.
　　*H04L 45/50*　　　(2022.01)
　　*H04L 45/586*　　(2022.01)

(56) References Cited

U.S. PATENT DOCUMENTS

| | | | |
|---|---|---|---|
| 10,887,222 B2 | 1/2021 | Wang | |
| 10,892,989 B2 | 1/2021 | Jain | |
| 10,931,552 B1 | 2/2021 | Zhang | |
| 11,012,351 B2 | 5/2021 | Feng | |
| 11,032,162 B2 | 6/2021 | Jain | |
| 11,036,536 B2 | 6/2021 | Wang | |
| 2016/0277291 A1* | 9/2016 | Lakshmikanthan | .. H04L 12/465 |
| 2017/0155724 A1 | 6/2017 | Haddad | |
| 2018/0302277 A1 | 10/2018 | Shimamura | |
| 2018/0309626 A1 | 10/2018 | Andrianov | |
| 2018/0309646 A1 | 10/2018 | Mustafiz | |
| 2019/0028350 A1 | 1/2019 | Yeung | |
| 2019/0129745 A1 | 5/2019 | Wang | |
| 2019/0132211 A1 | 5/2019 | Yeung | |
| 2019/0173802 A1 | 6/2019 | Xia | |
| 2020/0012510 A1 | 1/2020 | Andrianov | |
| 2020/0013107 A1 | 1/2020 | Kusano | |
| 2020/0236047 A1 | 7/2020 | Hira | |
| 2020/0272499 A1 | 8/2020 | Feng | |
| 2021/0135992 A1 | 5/2021 | Tidemann | |
| 2021/0136140 A1 | 5/2021 | Tidemann | |
| 2021/0136141 A1 | 5/2021 | Tidemann | |
| 2021/0144517 A1* | 5/2021 | Guim Bernat | ...... H04L 41/0869 |
| 2021/0226883 A1 | 7/2021 | Pawar | |
| 2021/0227041 A1 | 7/2021 | Sawant | |
| 2021/0227042 A1 | 7/2021 | Sawant | |
| 2021/0314899 A1* | 10/2021 | Shan | ..................... H04W 60/00 |
| 2022/0104164 A1* | 3/2022 | Kedalagudde | ........ H04W 60/04 |

FOREIGN PATENT DOCUMENTS

| | | |
|---|---|---|
| CN | 108292245 | 7/2018 |
| CN | 105975330 A | 6/2019 |
| WO | 2017181876 | 10/2017 |
| WO | WO2018001049 A1 | 1/2018 |

OTHER PUBLICATIONS

Alhussein, et al., Joint VNF Placement and Multicast Traffic Routing in 5G Core Networks (Year: 2018).

Bahnasse et al., Novel SDN architecture for smart MPLS Traffic Engineering—DiffServ Aware management. (Year 2018).

Davoli et al., Traffic Engineering with Segment Routing: SDN-based Architectural Design and Open Source Implementation, Fourth European Workshop on Software Defined Networks. (Year: 2015).

Lee et al., An efficient routing algorithm based on segment routing in software-designed networking. (Year 2016).

Ventre et al., Segment Routing: a Comprehensive Survey of Research Activities, Standardization Efforts and Implementation Results. (Year 2019).

Wang, et al., Segment Routing Optimization for VNF Chaining, (Year 2019).

CN Office Action dated Nov. 21, 2022 for CN202080054071.3.
EP Examination Report dated Sep. 19, 2022 for EP20740749.5.

* cited by examiner

SYSTEMS AND METHODS FOR IMPLEMENTING MULTI-PART VIRTUAL NETWORK FUNCTIONS

BACKGROUND

Virtual network functions ("VNFs") can refer to network architectures that use network virtualization technology to virtualize network node functions. VNFs can be connected to one another to create multi-part VNFs that enable network service chaining. Service chaining can refer to sequence of network services (such as firewalls, network address translation, intrusion protection, etc.) that are connected in a virtual chain. VNFs can offer content service providers ("CSPs") with opportunities to deploy complex network functions and services in distributed network models and architectures. The CSPs can model network topologies and construct network functions to include both virtual and physical network elements. Moreover, the CSPs can catalog physical and virtual network functions into functional information models and can associate metadata with corresponding network attributes.

Network function virtualization orchestrators ("NFVOs") can use virtualized infrastructure managers ("VIMs") to implement VNF services. The NFVO can construct suitable instruction sets to implement relatively complex, multi-part VNFs using a master VNF and multiple dependent VNFs. The services can be deployed according to service attributes described in a service level agreement ("SLA") that details some aspects of network functionality. The NFVOs can ensure the execution of appropriate SLAs for end customers that subscribe to the VNF service. However, current orchestration methods can have difficulties in creating multi-part VNF services across a physical network and virtualized network while meeting requirements imposed by corresponding SLAs.

As a result, a need exists for orchestration that can implement multi-part VNFs on virtualized and physical networks.

SUMMARY

Examples described herein include systems and methods for managing an integrated network including a physical network and a virtual network. In one example, the system can include a non-transitory, computer-readable medium containing instructions and a processor that executes the instructions to perform stages. The stages can include obtaining, by an NFVO, path computation information from the integrated network, the integrated network including a virtual source and a virtual destination. The stages can further include generating, using the path computation information, segments originating at the virtual source and terminating at the virtual destination. Moreover, the stages can include generating, by a VIM, a plurality of labels associated with physical links on the physical network, and determining, by the NFVO and using the plurality of labels, a network path for data transfer over the integrated network. As such, the VIM can orchestrate the management (for example, the allocation, upgrade, release, and reclamation) of NFV infrastructure hardware resources (for example, compute, storage, networking resources) and software resources (hypervisor resources) and optimize their use. In some examples, a hypervisor can include a software program that runs on an actual host hardware platform and supervises the execution of the guest operating systems on the VMs.

In some examples, obtaining the path computation information from the integrated network can further include obtaining the path computation information from a path computation element ("PCE"). The PCE can interface directly with various components of the underlying physical network. In other examples, obtaining the path computation information can further include obtaining the path computation information from a virtual router implementing an interior gateway protocol ("IGP") instance. In this way, the disclosed systems can obtain the path computation information indirectly using virtual elements that are tied to the underlying physical network. One example of an IGP can include a type of protocol used for exchanging routing information between gateways (for example, routers) within a system of networks. This routing information can then be used to route network-layer protocols like interne protocol ("IP").

The plurality of labels generated by the VIM may include multiprotocol label switching ("MPLS") labels associated with virtual switches for the virtual source, the integrated network, and the virtual destination. The generation of the plurality of labels can include generating the plurality of labels based on an SLA attribute associated with at least one of the physical network or the virtual network. The generation of the segments can include generating the segments based on at least one attribute of the physical links. In some examples, the SLA can include a contract between a service provider and an end user that defines the level of service expected from the service provider. SLAs can be output-based in that their purpose is specifically to define the level of services that the end user can receive.

The determination of the network path can further include at least one of (1) generating a first instruction set for the VIM to coordinate the data transfer over the virtual network, and (2) generating a second instruction set for a controller of the physical network to coordinate the data transfer over the physical network.

These stages can be performed by a system in some examples. Alternatively, a non-transitory, computer-readable medium including instructions can cause a processor to perform the stages when the processor executes the instructions.

Both the foregoing general description and the following detailed description are example and explanatory only and are not restrictive of the examples, as claimed.

DESCRIPTION OF THE EXAMPLES

Figure 1:
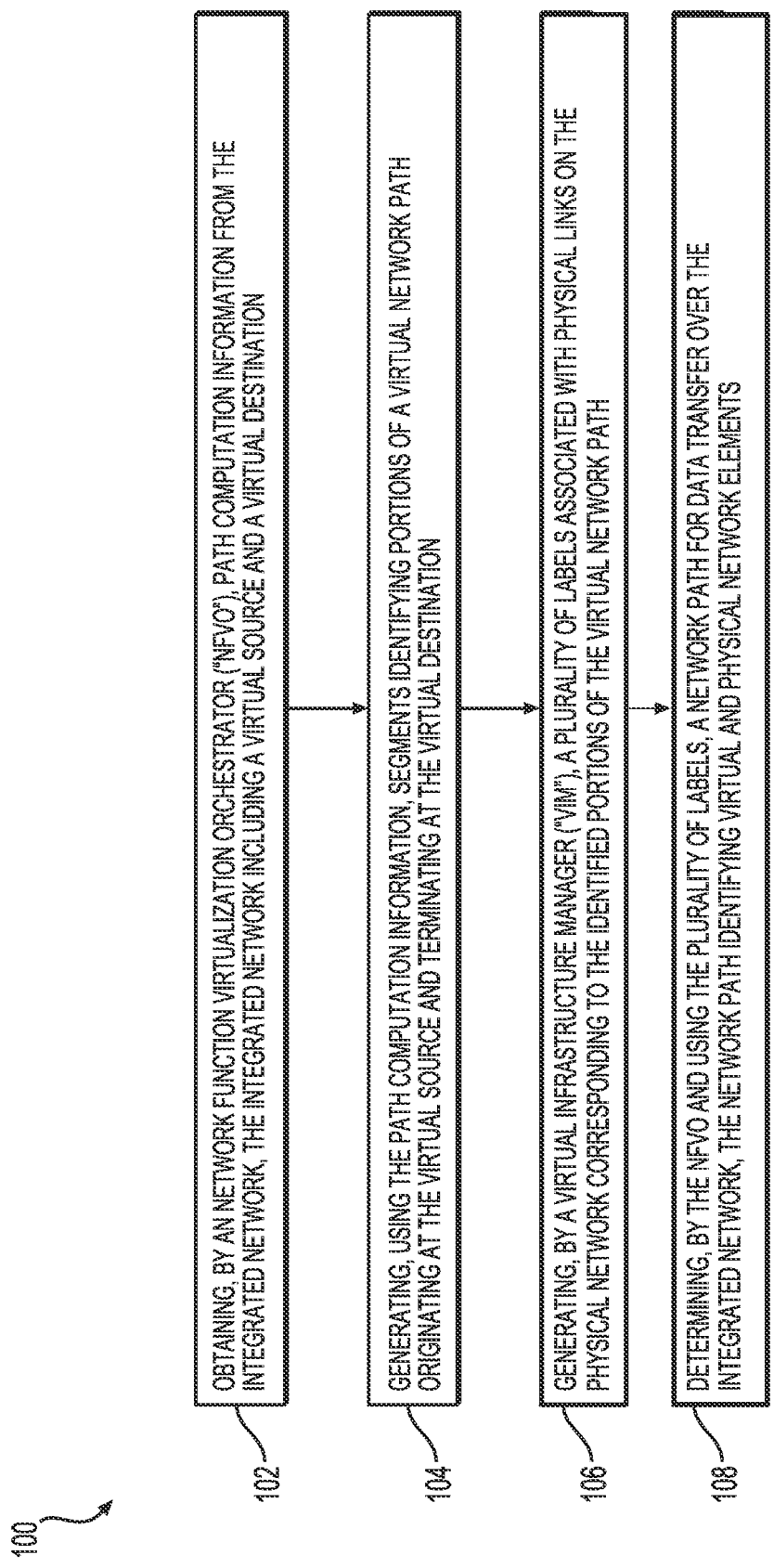
FIG. 1 is a flowchart of an example method for managing an integrated network including a physical network and a virtual network.

Reference will now be made in detail to the present examples, including examples illustrated in the accompanying drawings. Wherever possible, the same reference numbers will be used throughout the drawings to refer to the same or like parts.

As noted, with the increased use of multi-part VNFs, NFVOs can use VIMs to implement VNF services according to service attributes as specified by an SLA. In some examples, the VIM in an NFV implementation can manage the hardware and software resources that the service provider uses to create service chains and deliver network services to customers. A service chain can refer to a collection of connected network services (for example, firewalls, network address translation, intrusion protection, etc.) that can be connected in a virtual chain. Service chains can be used to set up suites or catalogs of connected services that enable the use of a single network connection for many services having different characteristics.

In some examples, a descriptor can include a template that describes aspects of the deployment and operational behavior of a virtual or an underlying physical network. Some example descriptors include a virtual VNF link descriptor ("VVLD") and a physical network function descriptor ("PNFD"). A VVLD can describe virtual link requirements for connecting one or more VNFs together. The PNFD can include a deployment template which describes a physical network function in terms of deployment and operational behavior requirements and can also contain connectivity, interface, and resource requirements.

In some examples, a relatively complex, multi-part VNF service can be constructed of a master VNF and multiple dependent VNFs. The multi-part VNF can include an instruction set that defines the VVLD and a PNFD. The instruction set can conform with a SLA and can describe links to use or avoid in the physical network for packet routing between network nodes. Orchestration can serve to ensure the execution of appropriate SLAs for end users that subscribe to the VNF service. For example, a virtual evolved packet core ("EPC") service that is allotted to a set of subscribers as part of a 5G network can have a corresponding SLA. The SLA can specify that the total end-to-end latency for traffic flows within the various components of the multi-part VNF may not exceed about 10 milliseconds. The orchestration can serve to ensure the execution of the latency requirement as specified by the example SLAs for users that subscribe to the VNF service.

The disclosure is generally directed to systems and methods for creating multi-part VNF services across physical and virtual domains of a network. In some examples, the physical domain can include legacy links. In order to create such multi-part VNF services, an NFVO may need to create multiple disjoint sets of instructions. One instruction set may need to be provided to the VIM associated with virtual tenancy (an architecture that allows users to share computing resources in a public or private cloud). Another instruction set may need to be provided to the wide area network ("WAN") or a software defined radio ("SDR") controller and the physical network's "network management system" ("NMS") to build the construct across the physical domain of the network. However, stitching the two domains together with corresponding paths may not be feasible using conventional systems and techniques. In some examples, SDR controllers in an SDN can refer to an application that acts as a control point in the SDN network, manages flow control to the switches and routers, and can include the applications and business logic to deploy networks. As used herein, an SDN can define a way to manage networks that separates a control plane from a forwarding plane. SDN can be a complementary approach to NFVs for network management. In other examples, an NMS can refer to an application or set of applications that lets network administrators manage a network's independent components inside a bigger network management framework. The NMS can be used to monitor both software and hardware components in a network. The NMS can record data from a network's remote points to carry out central reporting to a system administrator.

Accordingly, embodiments of the disclosure are generally directed to systems and methods for building VNF paths based on descriptors that can be passed by an NFVO-VIM interface. The disclosed systems can leverage the VIM as a controller to build paths across both the physical and virtual domains of the network. In some examples, the VIM can build the paths using definitions described in descriptors such as the VVLD or the PNFD. In some cases, there can be a lack of visibility around the physical network's topology within the physical domain. Accordingly, an appropriate path computation information in the underlying physical network can be extracted from "path computation element" ("PCE") controllers associated with the physical network. The disclosed systems can use the path computation information to generate multi-part VNFs that conform with the SLA.

In some examples, a PCE can include a device that computes paths on behalf of the nodes in a network. The device can be a router, a server, a virtualized entity running in a cloud, and the like. When a network node needs a path, it can make a request to the PCE using the PCE protocol ("PCEP"). The PCE can have access to topology information for the entire network and uses this in the path computations.

Once an appropriate path information is obtained, the VIM can build a network segment using any suitable segment routing technique. In some examples, segment routing can include a technique that allows a sender of a packet to partially or completely specify the route the packet takes through the network. In a segment routed network, an node can prepend a header to packets that contain a list of segments, which are instructions that are executed on subsequent nodes in the network. These instructions can be forwarding instructions, such as an instruction to forward a packet to a specific destination or interface.

The network segment can originate at a source virtual switch and terminate at a destination virtual switch. The network segment can thus correspond to a path between source and destination VNFs. Segment routing can involve constructing a point-to-point network path by a virtual switch using "multiprotocol label switching" ("MPLS") labels between the various VNFs that make up the multi-part VNF.

In some examples, MPLS can include a routing technique in telecommunications networks that directs data from one node to the next based on short path labels rather than long network addresses, thus avoiding lookups in a routing table and speeding traffic flows. The labels can identify virtual links (or paths) between distant nodes rather than endpoints. MPLS can encapsulate packets of various network protocols.

The label construct for the segment-routed path can be selective as to the physical links to use. In some examples, the physical links can be based on the SLA. For instance, the SLA can specify that a given path between the virtual switches associated with source and destination VNFs be programmed not to exceed 25 milliseconds. This example condition can be based on various known parameters of devices on the underlaying physical network.

In some examples, the information pertaining to the network segment and path can be provided by an external PCE controller. Further, the virtual switches can construct the segment by using a list of MPLS labels between the source switch, a transit switch corresponding to the underlying physical network, and a destination switch.

In other examples, the virtual switch can obtain the information pertaining to the network segment and path (for example, IGP and MPLS label information) from the underlying physical network using an IGP routing instance. The IGP routing instance can be provided by a virtual networking and security software such as "NSX" by VMWARE INC. or by a virtual router. Further, the virtual switch can construct the appropriate network segments for the multipart VNF based on the obtained information.

FIG. 1 is an illustration of an example method 100 for managing an integrated network including a physical network and a virtual network. In an example, an integrated network can include a combination of both a physical network and a virtualized network based on the physical network. At stage 102, the method can include obtaining, by an NFVO, path computation information from the integrated network, the integrated network including a virtual source and a virtual destination. The VIM can perform various operations for the integrated network including maintaining an inventory of the allocation of virtual resources to physical resources. As such, the VIM can orchestrate the allocation, upgrade, release, and reclamation of NFV infrastructure hardware resources (compute, storage, networking) and software resources (hypervisors) and optimize their use.

In some examples, the disclosed systems can obtain the path computation information from a PCE. The PCE can interface directly with various components of the underlying physical network. In other examples, the disclosed systems can obtain the path computation information from a virtual router implementing an IGP instance. In this way, the disclosed systems can obtain the path computation information indirectly using virtual elements that are tied to the underlying physical network. With this information, the VIM can support the management of VNF forwarding graphs by organizing virtual links, networks, and ports.

At stage 104, the method can include generating, using the path computation information, segments identifying portions of a virtual network path originating at the virtual source and terminating at the virtual destination. In some examples, the disclosed systems can generate the segments based on at least one attribute of the physical links. Further, the generating of the segments can be performed using any suitable segment routing technique. For example, in the segment routing technique, a node of the network can steer a packet through an ordered list of instructions, called segments. A segment can represent any suitable instruction, topological or service based. Segment routing can provide a mechanism that allows a flow of packets on the network to be restricted to a specific topological path.

At stage 106, the method can include generating, by a VIM, a plurality of labels associated with physical links on the physical network corresponding to the identified portions of the virtual network path. The disclosed systems can use the labels in implementing label switching to perform network relaying. With label switching, the disclosed systems can switch network packets more quickly at the data link layer rather than the network layer as can be performed by conventional techniques (for example, IP switching). Data packets can be assigned a label number and the switching takes place after examination of the label assigned to each packet.

In some examples, the plurality of labels can include MPLS labels associated with virtual switches for the virtual source, the integrated network, and the virtual destination. Segment routing can be applied to the MPLS with no change to the forwarding plane. The forwarding plane may define the part of the network architecture that routes packets arriving on an inbound interface of the network. The disclosed systems can encode a segment as an MPLS label. The disclosed systems can encode an ordered list of segments as a stack of labels. The segment to process is on the top of the stack. Upon completion of a segment, the disclosed systems can pop (that is, remove the most recently added element that was not yet removed) the related label from the stack. The disclosed systems can use the MPLS labels to enable a more scalable and protocol-independent packet-routing technique.

In some examples, the disclosed systems can generate the plurality of labels based on an SLA attribute associated with the physical network or the virtual network. The SLA attribute can include particular rules that a network or a network administrator can request to enforce. For example, the SLA attribute can indicate that a particular set of nodes in the underlying physical network should not be used. Accordingly, the disclosed systems can generate labels that avoid the use of the nodes to comply with the SLA attribute.

At stage 108, the method can include determining, by the NFVO and using the plurality of labels, a network path for data transfer over the integrated network, the network path identifying virtual and physical network elements. In some examples, the disclosed systems can generate a first instruction set for the VIM to coordinate the data transfer over the virtual network. In other examples, the disclosed systems can generate a second instruction set for a controller of the physical network to coordinate the data transfer over the physical network.

Figure 2:
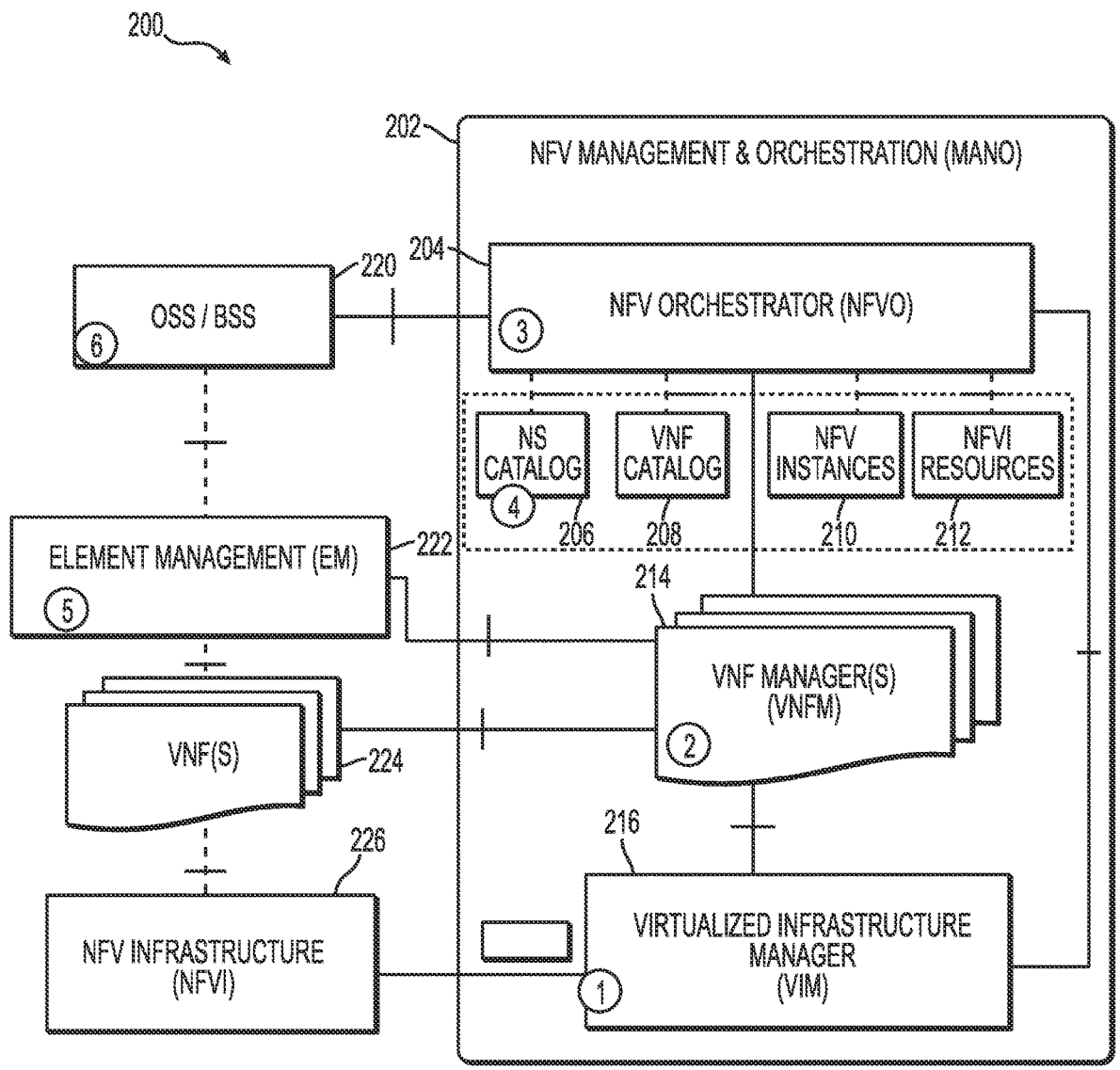
FIG. 2 is an example system diagram for managing the integrated network.

FIG. 2 is an illustration of an example system for managing an integrated network including a physical network and a virtual network. A conventional network may need one management system (for example, an NMS) and can be supported by an operations support system ("OSS"). A NFV network, in contrast, may need multiple managers, for example, a VIM manager, a virtual network function manager ("VNFM"), and an orchestrator.

Diagram 200 represents a network architecture schematic based on the ETSI's MANO model. In some examples, an network function virtualization ("NFV") MANO can include a framework developed by a working group of the same name within the European Telecommunications Standards Institute ("ETSI") for NFV. The NFV MANO can include the ETSI-defined framework for the management and orchestration of all resources in a virtualized data center including compute, networking, storage, and VM resources. In some examples, the VM can include a software simulation of a hardware platform that provides a virtual operating environment for guest operating systems.

In an example, an NFV can refer to an overarching concept of running software-defined network functions, independent of specific hardware platforms, as well as to a formal network virtualization initiative led by various telecommunications network operators.

In other examples, VNFs can refer to virtualized tasks formerly carried out by proprietary, dedicated hardware. In contrast to an NFV which represents the overarching concept, a VNF can refer to the building block of the tasks within ETSI's current NFV framework. VNFs can move individual network functions out of dedicated hardware devices into software that runs on commodity hardware.

These tasks can be used by both network service providers and businesses. The tasks can include, but are not limited to, firewalls, domain name system, caching or network address translation and can run as VMs. A NVF, on the other hand, can refer to the implementation of a network function using software that is decoupled from the underlying hardware.

In some examples, an NFVO can include a component of the NFV MANO architectural framework, which helps standardize the functions of virtual networking to increase interoperability of software-defined networking ("SDN") elements. The NFVO can perform resource orchestration and network service orchestration, as well as other functions.

ETSI can refer to a standards body that provides definitions related to the architecture and framework of NFV. The MANO 202 can include a VIM 216, a VNFM 214, and an NFVO 204. Diagram 200 further shows an element management ("EM") component 222 and an OSS/business support system ("BSS") 220. The EM 222 and the OSS/BSS 220 may not be directly part of the MANO 202. However, the EM 222 and the OSS/BSS 220 can exchange information with the MANO 202.

In some respects, the VIM 216 can manage the NFV infrastructure's ("NFVI") 226 resources. NFVI 226 can include physical resources (server, storage, and the like), the virtual resources (for example, VMs) and software resources (for example, hypervisors) in an NFV environment. In some examples, the NFV architecture can include multiple VIMs, each VIM managing its respective NFVI domain.

The VIM 216 can manage the life cycle of virtual resources in an NFVI 226 domain. In particular, the VIM 216 can create, maintain, and tear down VMs from physical resources in an NFVI 226 domain. The VIM 216 can keep inventory of VMs associated with physical resources. The VIM 216 can manage the performance and faults associated with hardware, software, and virtual resources. In some examples, the VIM 216 can maintain application program interfaces ("APIs") and expose physical and virtual resources to other management systems.

The VNFM 214 can manage VNFs 224, that is, the virtualized network elements such as router VNFs, switch VNFs, and the like. In some examples, the VNFM 214 can manage the life cycle of the VNFs 224. For example, the VNFM 214 can create, maintain, and terminate VNF 224 instances which can be installed on the VMs and which the VIM 216 can create and manage.

The VNFM 214 can provide for the fault, configuration, accounting, performance and security ("FCAPS") management of the VNFs 224. Moreover, the VNFM 214 can scale up or scale down the VNFs 224 which can result in scaling up and scaling down of corresponding resource usage (for example, processor usage). In some examples, there can be multiple VNFMs 214 managing separate VNFs 224 or there can be one VNFM 214 managing multiple VNFs 224.

As noted, there can be multiple VIMs 216 managing respective NFVI 226 domains. Accordingly, a NFVO 204 can serve to manage and coordinate the resources from different VIMs 216, when there are multiple VIMs 216 in the same or a different network location. The NFVO 204 can perform resource orchestration whereby the NFVO 204 coordinates, authorizes, releases, and engages NFVI resources among different points of presence ("PoPs") or within one PoP. A PoP can refer to an artificial demarcation point or interface point between communicating entities. The NFVO 204 can perform the resource orchestration by engaging with the VIMs 216 directly through their APIs instead of engaging with the NFVI resources directly.

Also as noted, there can be multiple VNFMs 214 managing their respective VNFs 224. Accordingly, the NFVO 204 can manage and coordinate the creation of an end-to-end service that involves VNFs 224 from different VNFMs 214 domains. The NFVO 204 can perform service orchestration to create the end-to-end service among different VNFs 224 that can be managed by different VNFMs 214. The NFVO 204 can perform service orchestration by coordinating with the respective VNFMs 214 so the NFVO 204 does not need to talk to the VNFs 224 directly. For example, the NFVO 204 can create a service between the VNFs 224 of one vendor and the VNFs 224 of another vendor. The NFVO 204 can perform service orchestration to instantiate VNFMs 214, where applicable. The NFVO 204 can perform topology management of network services instances which can also be referred to as VNF 224 forwarding graphs. The NFVO 204 can serve to bind together different functions of the VNF 224 and creates an end-to-end service in addition to performing resource coordination in an otherwise dispersed NFV environment.

Diagram 200 further shows various repositories (for example, files and lists) that hold different information in the MANO 202. The repositories can include a VNF catalog 208 that includes a repository of all usable VNF descriptors ("VNFDs"). A VNFD can refer to a deployment template which describes a VNF in terms of its deployment and operational behavior requirements. The VNFDs can be used by the VNFM 214 in the process of VNF 224 instantiation and lifecycle management of VNF 224 instances. The NFVO 204 can also use the information provided in the VNFDs to manage and orchestrate network services and virtualized resources on the NFVI 226.

The repositories can include a network services ("NS") catalog 206 that can include a catalog of the usable network services. The NS catalog 206 can store a deployment template for a network service in terms of VNFs 224 and descriptions of their connectivity through virtual links. The repositories can include NFV instances 210 which can hold the details about network services instances and related VNF instances. The repositories can include NFVI resources 212 that can list the resources that can be provided to establish NFV services.

As noted, the EM 222 and the OSS/BBS 220 management systems may not be part of the MANO 202 but can exchange information with MANO 202. The EM 222 can provide FCAPs for the VNF 224. The VNFM 214 can also provide similar services of the VNF 224 for the virtual part of the VNF 224.

For example, the MANO 202 can generally be responsible for managing the changes between the virtual and physical domains. The VNFM 214 can perform life cycle management and FCAPS for the VNF 224. For instance, if there is an issue with the spinning up of a VNF 224, the issue can be reported by the VNFM 214. However, if the fault is related to a function, the fault can be highlighted by the EM 222.

The OSS/BSS 220 can include a collection of systems and applications that a service provider uses to operate its business. The VNF 224 can work in coordination with the OSS/BSS 220. The disclosed systems can extend the functionalities of the OSS/BSS 220 to manage the VNFs 224 and the NFVI 226 directly. The OSS/BBS 220 can extend the functionality of the MANO 202 by offering additional functions if they are not supported by a certain implementation of MANO 202.

Figure 3:
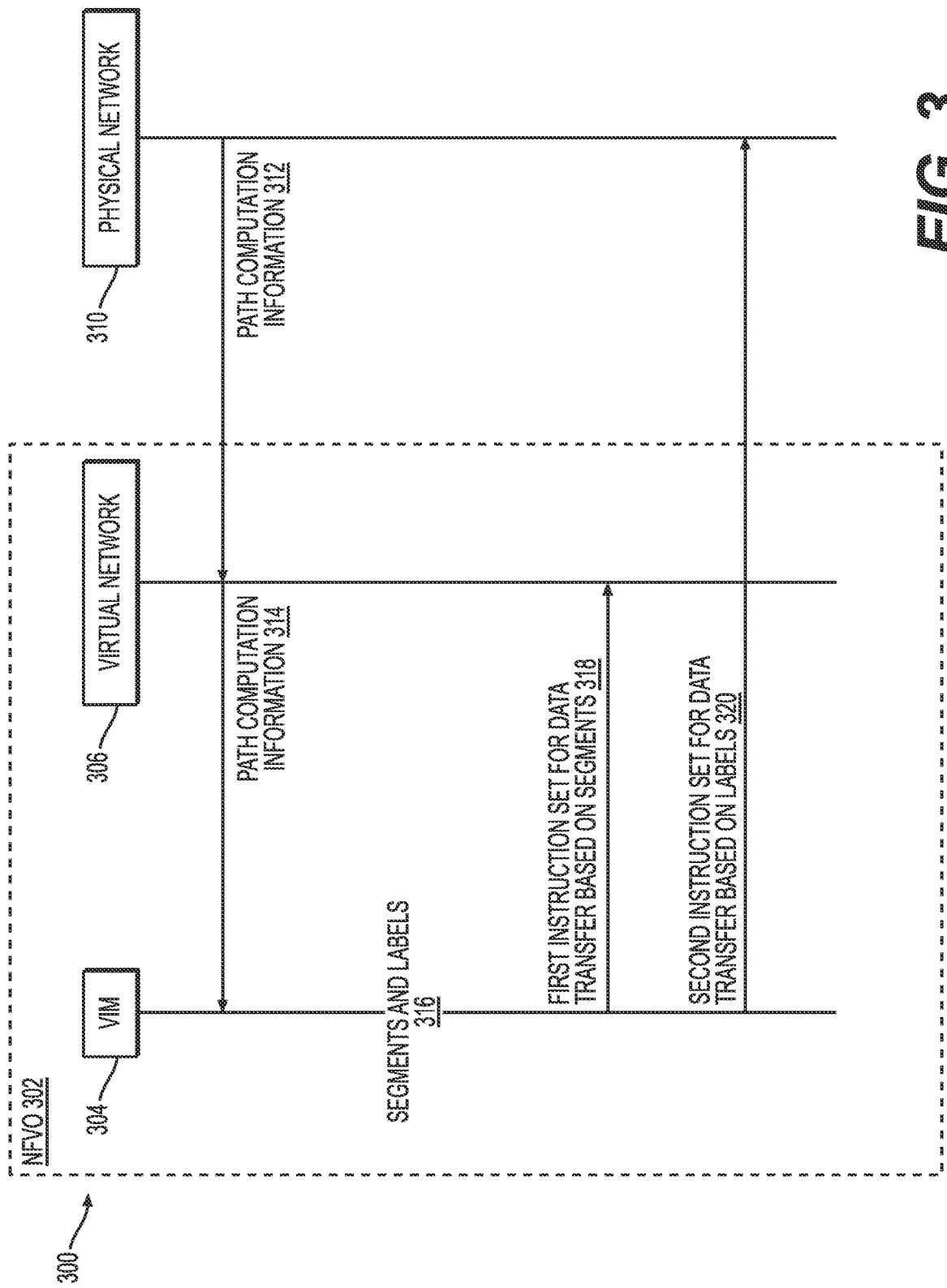
FIG. 3 an example sequence diagram of example stages for communications between integrated network components to control information flow on the network.

FIG. 3 is an illustration of an example sequence diagram of example communications between integrated network components to control information flow on the network. Diagram 300 shows an NFVO 302, a VIM 304, a virtual network 306, and a physical network 310. The NFVO 302 can control the operations of the VIM 304 and the virtual network 306. The virtual network 306 and a physical network 310 can together constitute an integrated network. As noted, the NFVO 302 can serve to create an end-to-end service in addition to performing resource coordination on the integrated network. In order to perform these services, the NFVO 302 can obtain information associated with the integrated network to route data packets efficiently between nodes on the physical network.

The physical network 310 can transmit, at stage 312, path computation information to the virtual network 306, which can in turn transmit, at stage 314, computation information to the VIM 304. As noted, physical network 310 can transmit the path computation information using a PCE. Further, the physical network 310 can transmit the path computation information from a virtual router implementing an IGP. In some examples, the path computation information can include information that describes a suitable route for conveying data between a source and a destination node on the network. The path computation information may satisfy a set of network-related constraints, such as quality of service ("QoS"), policy, or price constraints. In some examples, the path computation information can include label switched paths for MPLS traffic engineering.

The VIM 304 can generate, at stage 316, segments and labels. As noted, the disclosed systems can generate the segments in accordance with the segment routing technique. The segments can refer to specific nodes and forwarding paths in the network between a source node and a destination node. The segments can include a node segment that can identify the shortest path to a destination node. Additionally, the segments can include an adjacency segment, which can represent a link between two nodes that are adjacent on the network. The node segment can be advertised throughout the network, and remote nodes can install the segment in their respective MPLS data planes. The disclosed systems can also assign a globally unique identifier known as segment identifier (SID) to each node. A node can then allocate a local SID for each of its adjacency segments, which are stored only by that specific node in its data plane. The disclosed systems can create a segment routing tunnel that can contain a single segment that represents a path to a destination or a segment list, which is a set of segments that the tunnel will encode to reach its destination. Further, the disclosed systems can encode the labels and MLPS label in order to achieve interoperability between different networking protocols.

The VIM 304 can transmit, at stage 318, a first instruction set for data transfer based on segments. The first instruction set can represent instructions that a node executes on an incoming packet. Examples of such instructions can include, but are not limited to, instructions to forward the packet according to the shortest path to destination, forward the packet through a specific interface, and deliver the packet to a given application or service instance.

The VIM 304 can also transmit, at stage 320, a second instruction set for data transfer based on the labels determined at stage 316. The second instructions can represent instructions indicating the specific ports to use on the various physical nodes of the underlying physical network. For example, the second instruction set can include instructions indicating that ports 66, 68, 65 of a router associated with a given series of nodes on the physical network should be used in the transmission of a data packet across the network.

Figure 4:
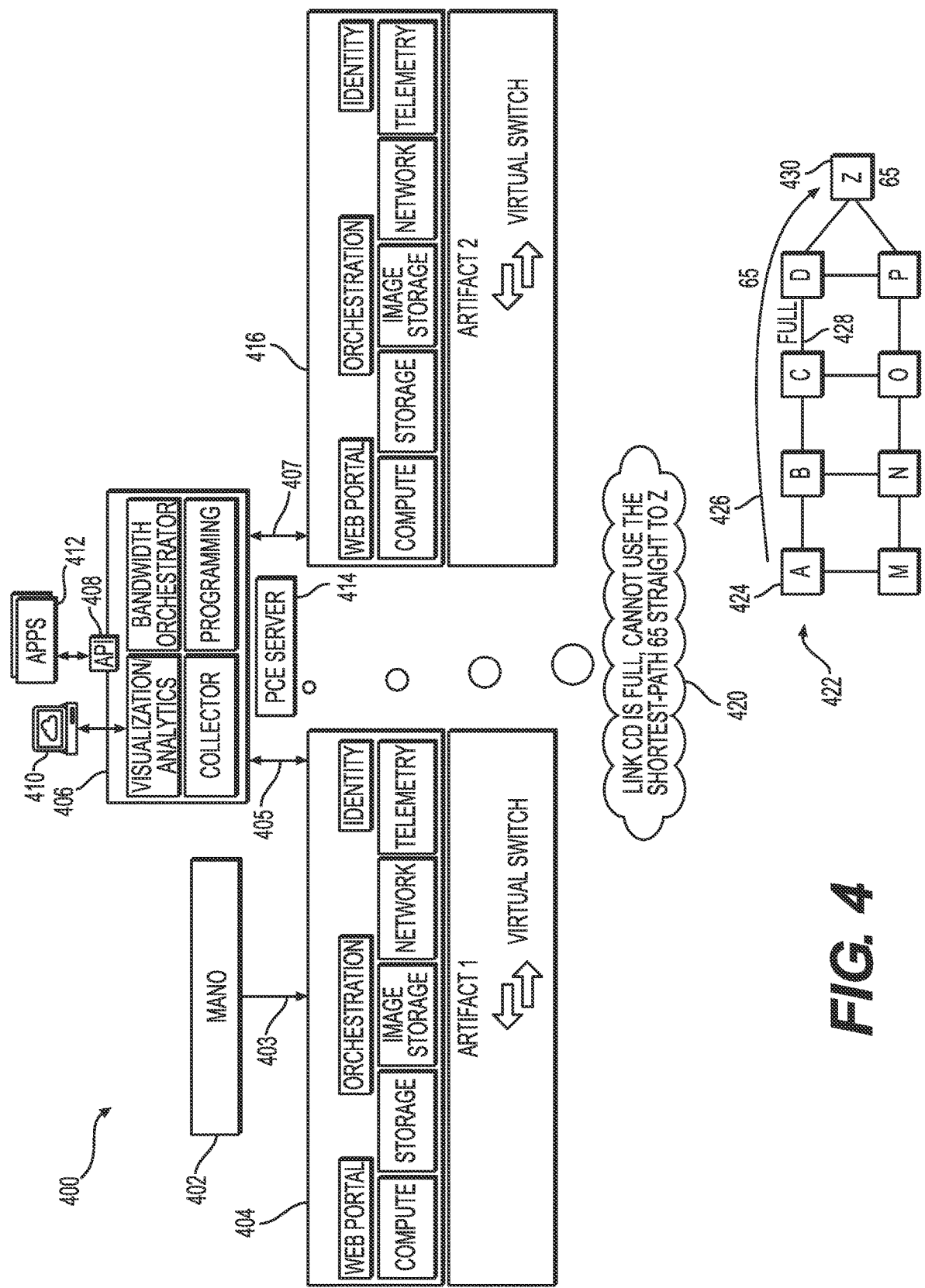
FIG. 4 is an illustration of an example schematic representing communications between VIMs and corresponding physical nodes on the integrated network.

FIG. 4 is an illustration of an example schematic representing communications between VIMs and corresponding physical nodes on an integrated network. Diagram 400 shows a MANO 402 that can communicate 403 with a first artifact 404. An artifact can refer to a software module, a script or an output of a build process. The MANO 402 can determine the requirements for various network services or VNFs and can communicate those requirements to the VIM. The VIMs may be associated with corresponding artifacts, such as first artifact 404 and second artifact 416.

The first artifact 404 can communicate 405 with a network element 406, the network element 406 including a variety of modules such as a visualization/analytics module, collector module, bandwidth orchestrator module, and programming module. These modules may serve to perform associated visualization, bandwidth orchestration, and programming functions. The network element 406 can include an API 408 which can serve to interface with computers 410 and applications 412. Moreover, the network element 406 can be part of a PCE server 414. The network element 406 can communicate 407 with the second artifact 416. Diagram 400 further illustrates that the network element 406 can determine (for example, based on communications 405 and 407 between artifacts 404 and 416), at stage 420, that a communications path 428 between nodes C and D on a physical network 422 is full. Accordingly, the disclosed systems can determine that a path 426 between node A 424 and node Z 430 cannot use the shortest path including nodes C and D to communicate. In some cases, the nodes (for example, node A 424 and node Z 430) can also be referred to as physical network functions (PNFs). In some examples, the nodes can include a router, a mobile gateway, and the like on the physical network.

As noted, the first artifact 404 and the second artifact 416 can use the same VNF. In some examples the artifacts can represent two software modules that pertain to the same VNF. The disclosed systems can deploy the VNFs on the virtual layer using the MANO 402. In some examples, the MANO 402 can create the VNFs and corresponding artifacts 404 and 416 using VNF descriptors. The artifacts 404 and 416 can be on two different clusters or on multiple instances depending on the VNF's configuration. When creating the artifacts 404 and 416, the MANO 402 can configure a bandwidth budget (for example, approximately 2 GB to 3 GB) associated with their interconnection between the network element 406. In some cases, the bandwidth budget can be more relevant to the underlying physical network as opposed to the virtual network because the physical network can transfer data using the physical bandwidth. The MANO 402 can locally instantiate the artifacts and a VIM on the network element 406 can create communications 405 and 407 between the first artifact 404 and the second artifact 416.

In some examples, the network element 406 may not have visibility into the physical network. Accordingly, the network element 406 can communication with the PCE server 414. The PCE server 414 can have visibility into the physical network. The PCE server 414 can determine a path between a source node (for example, node A 424) and a destination node (for example, node Z 430) that has the appropriate bandwidth. As noted, path 426 includes a path 428 between nodes C and D that have relatively full bandwidth utilization. Accordingly, the network element 406 may not provision or create path 426. The network element 406 can screen paths based on information received from the PCE server 414 and can reject non-compliant paths. The network element 406 can similarly evaluate other potential paths between the source node and the destination node based on a bandwidth-usage criteria and can select a path having the lowest bandwidth usage.

In some examples, first artifact 404 can represent a VNF master and second artifact 416 can represent a VNF subset or a VNF subordinate. Artifacts 404 and 416 can represent example artifacts, and there can be several VNF subordinates for a given VNF master. In some examples, the VNF master component can perform a set of functions but may also control the VNF subordinates. Further, the VNF subordinates can each have a particular task that the VNF subordinates can perform in the network.

As noted, the artifacts can represent virtualized physical components of the underlying network. Further, the artifacts can have various APIs like web portal, orchestration, identity, compute, storage, image storage, network, and telemetry. These APIs can represent ways that the artifacts can interface with the virtual infrastructure. The APIs can allow any orchestration platform to interface with the VIM and create instances of resources or functions on the virtualized compute, virtualized storage, and the like. Accordingly, the artifacts and associated APIs may not be strongly coupled to the physical network. The APIs can represent a logical interface between the orchestration platform and the virtualized infrastructure. The APIs can obtain relevant information from the physical network, for example, resource utilization, network availability, optimal path information, optimal network entry points to create a tunnel, and the like.

Figure 5:
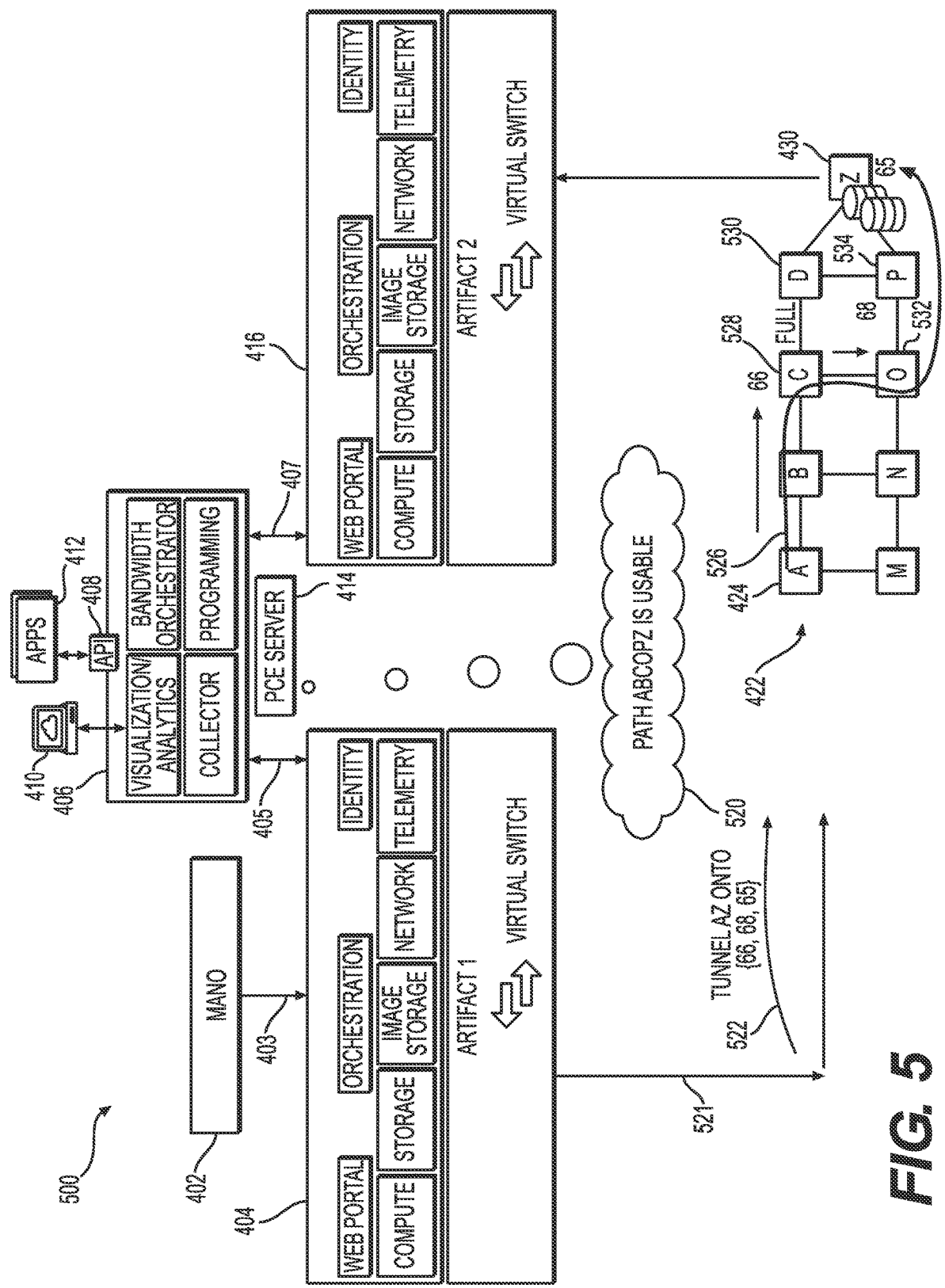
FIG. 5 is an illustration of an example schematic continuing the example communications shown and described in connection with FIG. 4.

FIG. 5 is an illustration of an example schematic continuing the example communications shown and described in connection with FIG. 4, above. Diagram 500 again shows the various components shown and described in connection with FIG. 4, including the MANO 402, the first artifact 404, the network element 406, the API 408, the computers 410, the applications 412, the PCE server 414, and the second artifact 416.

Further, diagram 500 illustrates that the network element 406 can determine not to use a path between node A 424 and node Z 430 if the path includes node C and node D. The network element 406 can determine not to use this path because the bandwidth use may not be within the scope of a corresponding SLA. Accordingly, the network element 406 can determine, at stage 520, to use a different path 526, the path 526 including node O 532 and node P 534. This path 526 can have an attribute (for example, a bandwidth) use that can be within the scope of the SLA.

Further, the network element 406 can communicate 405, to a corresponding VIM associated with the first artifact 404, corresponding MPLS labels (for example, ports 66, 68 and 65 corresponding to node C 528, node P 534, and node Z 430). Diagram 500 further shows a segment routing tunnel 522 that can include a logical representation of the physical path that the traffic should be routed. For instance, path 526 including nodes A, B, C, O, P, Z can be a logical representation of the corresponding routers on a physical network that data packets would traverse. The VIM of the first artifact 404 can include the MPLS labels (for example, labels 66, 68 and 65) to ensure that the VIM correctly steers the packets on an appropriate physical path that has adequate bandwidth. The VIM of the first artifact 404 can add the MPLS labels to a header of a frame including the data packets to be transmitted between nodes to ensure that the data packets are routed to the second artifact 416.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as example only, with a true scope and spirit of the disclosure being indicated by the following claims.

What is claimed is:

1. A system for managing an integrated network comprising a physical network and a virtual network, comprising:
a non-transitory, computer-readable medium containing instructions; and
a processor that executes the instructions to perform stages comprising:
obtaining path computation information describing a portion of the integrated network, the integrated network including a virtual source and a virtual destination;
generating, using the path computation information, segments identifying portions of a virtual network path for a multi-part virtual network function ("VNF"), the virtual network path originating at the virtual source and terminating at the virtual destination;
generating, by a virtual infrastructure manager ("VIM"), a plurality of labels associated with physical links on the physical network corresponding to the identified portions of the virtual network path;
appending a stack of labels to a packet, the stack of labels corresponding to a network path for data transfer over the integrated network, the network path identifying virtual and physical network elements, wherein the network path is chosen to comply with service level agreement ("SLA") requirements for the multi-part VNF based on the path computation information of the segments in the network path; and
routing the packet through the multi-part VNF by determining the virtual and physical network elements from the labels of the stack.

2. The system of claim 1, wherein obtaining the path computation information comprises obtaining the path computation information from a path computation element ("PCE").

3. The system of claim 1, wherein the path computation information is obtained from a virtual router implementing an interior gateway protocol ("IGP") instance.

4. The system of claim 1, wherein the plurality of labels comprise multiprotocol label switching ("MPLS") labels associated with virtual switches for the virtual source, the integrated network, and the virtual destination.

5. The system of claim 1, wherein generating the plurality of labels comprises generating the plurality of labels based on an SLA attribute associated with at least one of the physical network or the virtual network, wherein the generated labels exclude at least one node that the SLA forbids.

6. The system of claim 1, wherein the segments are generated based on at least one attribute of the physical links.

7. A method for managing an integrated network comprising a physical network and a virtual network, comprising:

obtaining path computation information describing a portion of the integrated network, the integrated network including a virtual source and a virtual destination;

generating, using the path computation information, segments identifying portions of a virtual network path for a multi-part virtual network function ("VNF"), the virtual network path originating at the virtual source and terminating at the virtual destination;

generating, by a virtual infrastructure manager ("VIM"), a plurality of labels associated with physical links on the physical network corresponding to the identified portions of the virtual network path;

appending a stack of labels to a packet, the stack of labels corresponding to a network path for data transfer over the integrated network, the network path identifying virtual and physical network elements, wherein the network path is chosen to comply with service level agreement ("SLA") requirements for the multi-part VNF based on the path computation information of the segments in the network path; and routing the packet through the multi-part VNF by determining the virtual and physical network elements from the labels of the stack.

8. The method of claim 7, wherein obtaining the path computation information comprises obtaining the path computation information from a path computation element ("PCE").

9. The method of claim 7, wherein the path computation information is obtained from a virtual router implementing an interior gateway protocol ("IGP") instance.

10. The method of claim 7, wherein the plurality of labels comprise multiprotocol label switching ("MPLS") labels associated with virtual switches for the virtual source, the integrated network, and the virtual destination.

11. The method of claim 7, wherein generating the plurality of labels comprises generating the plurality of labels based on an SLA attribute associated with at least one of the physical network or the virtual network, wherein the generated labels exclude at least one node that the SLA forbids.

12. The method of claim 7, wherein the segments are generated based on at least one attribute of the physical links.

13. A non-transitory, computer-readable medium comprising instructions that, when executed by a processor, perform stages for managing an integrated network comprising a physical network and a virtual network, the stages comprising:

obtaining path computation information describing a portion of the integrated network, the integrated network including a virtual source and a virtual destination;

generating, using the path computation information, segments identifying portions of a virtual network path for a multi-part virtual network function ("VNF"), the virtual network path originating at the virtual source and terminating at the virtual destination;

generating, by a virtual infrastructure manager ("VIM"), a plurality of labels associated with physical links on the physical network corresponding to the identified portions of the virtual network path;

appending a stack of labels to a packet, the stack of labels corresponding to a network path for data transfer over the integrated network, the network path identifying virtual and physical network elements, wherein the network path is chosen to comply with service level agreement ("SLA") requirements for the multi-part VNF based on the path computation information of the segments in the network path; and routing the packet through the multi-part VNF by determining the virtual and physical network elements from the labels of the stack.

14. The non-transitory, computer-readable medium of claim 13, wherein obtaining the path computation information comprises obtaining the path computation information from a path computation element ("PCE").

15. The non-transitory, computer-readable medium of claim 13, wherein the path computation information is obtained from a virtual router implementing an interior gateway protocol ("IGP") instance.

16. The non-transitory, computer-readable medium of claim 13, wherein the plurality of labels comprise multiprotocol label switching ("MPLS") labels associated with virtual switches for the virtual source, the integrated network, and the virtual destination.

17. The non-transitory, computer-readable medium of claim 13, wherein generating the plurality of labels comprises generating the plurality of labels based on a SLA attribute associated with at least one of the physical network or the virtual network, wherein the generated labels exclude at least one node that the SLA forbids.

18. The system of claim 1, wherein routing the packet includes popping a corresponding label off of the stack at each node of the VNF.

19. The method of claim 7, wherein routing the packet includes popping a corresponding label off of the stack at each node of the VNF.

20. The non-transitory, computer-readable medium of claim 13, wherein routing the packet includes popping a corresponding label off of the stack at each node of the VNF.

* * * * *